(12) United States Patent
Goldovsky

(10) Patent No.: US 6,912,560 B2
(45) Date of Patent: Jun. 28, 2005

(54) ADDER WITH IMPROVED OVERFLOW FLAG GENERATION

(75) Inventor: Alexander Goldovsky, Philadelphia, PA (US)

(73) Assignee: Agere Systems, Inc., Allentown, PA (US)

( * ) Notice: Subject to any disclaimer, the term of this patent is extended or adjusted under 35 U.S.C. 154(b) by 605 days.

(21) Appl. No.: 09/733,686

(22) Filed: Dec. 8, 2000

(65) Prior Publication Data

US 2002/0103842 A1 Aug. 1, 2002

(51) Int. Cl.$^7$ .................................................. G06F 7/00
(52) U.S. Cl. ................................................. 708/525
(58) Field of Search ................................. 708/525, 523, 708/700, 498, 714

(56) References Cited

U.S. PATENT DOCUMENTS

| | | | | |
|---|---|---|---|---|
| 4,441,158 A | * | 4/1984 | Kanuma ..................... | 708/626 |
| 4,739,503 A | * | 4/1988 | Armer et al. ............... | 708/706 |
| 5,010,511 A | * | 4/1991 | Hartley et al. .............. | 708/707 |
| 5,257,218 A | * | 10/1993 | Poon .......................... | 708/712 |
| 5,260,890 A | * | 11/1993 | Suzuki ........................ | 708/553 |
| 5,270,955 A | * | 12/1993 | Bosshart et al. ............ | 708/525 |
| 5,337,269 A | | 8/1994 | McMahan et al. | |
| 5,477,480 A | * | 12/1995 | Inui ............................ | 708/711 |
| 5,523,963 A | * | 6/1996 | Hsieh et al. ................ | 708/707 |
| 5,539,685 A | * | 7/1996 | Otaguro ...................... | 708/625 |
| 5,581,497 A | | 12/1996 | Kumar | |
| 5,636,156 A | * | 6/1997 | Mikan et al. ................ | 708/712 |
| 5,907,498 A | * | 5/1999 | Rim ............................ | 708/553 |
| 6,529,931 B1 | * | 3/2003 | Besz et al. .................. | 708/711 |
| 6,539,413 B1 | * | 3/2003 | Goldovsky et al. ......... | 708/700 |

OTHER PUBLICATIONS

A. Weinberger and J.L. Smith, "A One–Microsecond Adder Using One–Megacycle Circuitry," IRE Trans. on Electronic Computers, pp. 65–73, Jun. 1956.

T.–F. Ngai et al., "Regular, Area–Time Efficient Carry–Lookahead Adders," Journal of Parallel and Distributed Computing, vol. 3, pp. 92–105, 1986.

P.M. Kogge and H.S. Stone, "A Parallel Algorithm for the Efficient Solution of a General Class of Recurrence Equations," IEEE Trans. on Computers, vol. C–22, No. 8, pp. 786–793, Aug. 1973.

(Continued)

*Primary Examiner*—Kakali Chaki
*Assistant Examiner*—Chat C. Do

(57) ABSTRACT

An adder includes a number of computational stages each associated with one or more bit positions. Particular ones of the computational stages generate a sum output signal and a primary carry-output signal of the adder. A flag generation circuit is coupled to at least one of the stages and is operative to generate an overflow flag for the adder substantially in parallel with the generation of the sum output signal and the primary carry-output signal of the adder. Advantageously, the invention substantially reduces the computational delay associated with generation of the overflow flag, relative to that of conventional adders, without requiring an increase in transistor count or circuit area.

16 Claims, 2 Drawing Sheets

OTHER PUBLICATIONS

R.P. Brent and H.T. Kung, "A Regular Layout for Parallel Adders," IEEE Trans. on Computers, vol. C–31, No. 3, pp. 260–264, Mar. 1982.

D. Dozza et al., "A 3.5 NS, 64 Bit, Carry–Lookahead Adder," in Proc. Intl. Symp. Circuits and Systems, pp. 297–300, 1996.

J. Silberman et al., "A 1.0 GHz Single–Issue 64b PowerPC Integer Processor," IEEE Intl. Solid–State Circuits Conf., pp. 230–231, Feb. 1998.

W. Liu et al., "A 250–MHz Wave Pipelined Adder in 2–$\mu$m CMOS," IEEE Journal of Solid–State Circuits, vol. 29, No. 9, pp. 1117–1128, Sep. 1994.

A. Beaumont–Smith et al., "A GaAs 32–bit Adder," IEEE Symposium Computer Arithmetic, pp. 10–17, Jul. 1997.

Z. Wang et al., "Fast Adders Using Enhanced Multiple–Output Domino Logic," IEEE Journal of Solid–State Circuits, vol. 32, No. 2, pp. 206–214, Feb. 1997.

G. Bewick et al., "Approaching a Nanosecond: A 32 Bit Adder," IEEE International Conference on Computer Design: VLSI in Computers & Processors, pp. 221–226, Oct. 1988.

A. Weinberger, "High–Speed Binary Adder," IBM Technical Disclosure Bulletin, vol. 24, No. 8, pp. 4393–4398, Jan. 1982.

S. Knowles, "A Family of Adders," IEEE Symposium Computer Arithmetic, pp. 30–34, 1999.

A. Goldovsky et al., "A 1.0–nsec 32–bit Prefix Tree Adder in 0.25–$\mu$m Static CMOS," $43^{rd}$ Midwest Symposium on Circuits and Systems, 5 pages, Aug. 1999.

\* cited by examiner

ADDER WITH IMPROVED OVERFLOW FLAG GENERATION

RELATED APPLICATIONS

The present application is related to U.S. patent application Ser. No. 09/291,677 filed Apr. 14, 1999 in the name of inventors M. Besz et al. and entitled "Prefix Tree Adder with Efficient Carry Generation," which issued Mar. 4, 2003 as U.S. Pat. No. 6,529,931, U.S. patent application Ser. No. 09/525,644 filed Mar. 15, 2000 in the name of inventors A. Goldovsky et al. and entitled "Prefix Tree Adder with Efficient Sum Generation," which issued Mar. 25, 2003 as U.S. Pat. No. 6,539,413, and U.S. patent application Ser. No. 09/569,022 filed May 11, 2000 in the name of inventors A. Goldovsky et al. and entitled "Incorporation of Split-Adder Logic within a Carry-Skip Adder without Additional Propagation Delay," which issued Jun. 24, 2003 as U.S. Pat. No. 6,584,484, all of which are incorporated by reference herein.

FIELD OF THE INVENTION

The present invention relates generally to adder circuits for use in semiconductor integrated circuits and other electronic devices, and more particularly to techniques for generating overflow flags in such adder circuits.

BACKGROUND OF THE INVENTION

In a conventional n-bit prefix tree adder, the addition of two numbers A and B, $$A = -a_{n-1}2^{n-1} + \sum_{j=0}^{n-2} a_j 2^j$$

$$B = -b_{n-1}2^{n-1} + \sum_{j=0}^{n-2} b_j 2^j$$

represented in two's complement binary form, can be accomplished by computing:

$$\left. \begin{array}{l} g_j = a_j b_j \\ t_j = a_j + b_j \\ p_j = a_j \oplus b_j = \overline{g}_j t_j \\ c_j = g_j + p_j c_{j-1} \\ s_j = p_j \oplus c_{j-1} \end{array} \right\} \forall j \ 0 \le j < n$$

where $c_{-1}$ is the primary carry-input signal. The signals designated $g_j$, $t_j$, $p_j$ and $c_j$ are referred to as generate, transmit, propagate and carry signals, respectively. The resulting sum of A and B is $$S = -s_{n-1}2^{n-1} + \sum_{j=0}^{n-2} s_j 2^j.$$

An overflow occurs, and the resulting sum is invalid, if $$OVF = c_{n-1} \oplus c_{n-2} = 1,$$

where OVF is an overflow flag.

FIG. 1 shows an example of a logic circuit 100 that may be used to generate the overflow flag OVF in a conventional n-bit prefix tree adder of the type described above. The circuit 100 thus represents a portion of the conventional adder, and in this example includes a two-input OR gate 102, a two-input AND gate 104, a first two-input exclusive-or (XOR) gate 106, and a second two-input XOR gate 108. The primary carry-output signal $c_{n-1}$ is generated as an output of the OR gate 102 and is applied as an input to the XOR gate 108. The carry signal $c_{n-2}$ is applied as an input to both the XOR gate 106 and the XOR gate 108. The XOR gate 106 generates the sum signal $s_{n-1}$ as the exclusive-or of the carry signal $c_{n-2}$ and the propagate signal $p_{n-1}$. The sum signal $s_{n-1}$ is the final sum bit of the n-bit adder. The XOR gate 108 generates the overflow flag OVF as the exclusive-or of the carry signals $c_{n-1}$ and $c_{n-2}$. It is important to note that in this conventional circuit, the overflow flag OVF is generated after the addition is completed. Unfortunately, this results in an excessive amount of computational delay.

A gate level model may be used to quantify the computational delay of the FIG. 1 logic circuit 100. In accordance with such a model, a 2-input gate such as a NAND or NOR gate may be specified as having a delay of δ, while XOR/XNOR, AOI (and-or-invert), OAI (or-and-invert) and 2-to-1 multiplexer gates each have a delay of 1.5δ. Using this model, the computational delay associated with generation of the overflow flag OVF in the logic circuit 100 is 3δ, corresponding to an adder delay of 1.5δ plus a delay of 1.5δ for the XOR gate 108, as is illustrated in the figure.

Improved adders which can provide significant reductions in logic depth, computational delay and circuit area relative to conventional adders are disclosed in the above-cited U.S. patent applications Ser. No. 09/291,677, Ser. No. 09/525,644 and Ser. No. 09/569,022. Although these improved adders provide substantial advantages over conventional adders, a need nonetheless remains for further improvements, particularly in terms of reducing the above-described computational delay associated with overflow flag generation.

SUMMARY OF THE INVENTION

The invention provides improved techniques for generation of an overflow flag in a prefix tree adder or other type of adder circuit. In accordance with one aspect of the invention, an overflow flag is generated in parallel with generation of at least one of a sum signal and a primary carry-output signal of the adder. As a result, the computational delay associated with overflow flag generation is substantially reduced. Advantageously, this improvement is provided without requiring any increase in the transistor count or circuit area of the adder.

In an illustrative embodiment of the invention, an n-bit adder includes a number of computational stages each associated with one or more bit positions. Particular ones of the computational stages generate a sum output signal in the form of a final sum bit $s_{n-1}$ of the n-bit adder and a primary carry-output signal $c_{n-1}$ of the n-bit adder. A flag generation circuit is coupled to at least one of the stages and is operative to generate an overflow flag for the adder substantially in parallel with the generation of the sum output signal $s_{n-1}$ and the primary carry-output signal $c_{n-1}$. The flag generation circuit is configured such that it does not require the primary carry-output signal $c_{n-1}$ to generate the overflow flag for the n-bit adder.

In accordance with another aspect of the invention, the flag generation circuit for an n-bit adder may generate an overflow flag OVF as:

$$OVF = c_{n-2}\bar{t}_{n-1} + g_{n-1}\bar{c}_{n-2},$$

where $c_{n-2}$ is an n−2 carry signal of the adder, $t_{n-1}$ is an n−1 transmit signal of the adder, and $g_{n-1}$ is an n−1 generate signal of the adder. As a result, the generation of the overflow flag OVF does not require the use of a primary carry-output signal $c_{n-1}$ of the adder.

In accordance with a further aspect of the invention, the flag generation circuit may include a multiplexer which selects one of a plurality of input signals for propagation to its output as the overflow flag based at least in part on a signal associated with the signal line of at least one of the computational stages. For example, the overflow flag OVF described above can be generated using a 2-to-1 multiplexer which receives as a first input a transmit signal $t_{n-1}$, receives as a second input a generate signal $\bar{g}_{n-1}$, and receives as a select signal a carry signal $c_{n-2}$. Depending on the value of the select signal, the multiplexer selects either the transmit signal $t_{n-1}$ or the generate signal $\bar{g}_{n-1}$ for propagation in inverted form to its output as the overflow flag.

The efficient overflow flag generation techniques of the present invention provide a substantially reduced computational delay relative to the above-described conventional adder architectures. The techniques of the invention are applicable to a wide variety of adders, including prefix tree adders, carry-lookahead adders, carry-skip adders, carry-ripple adders, carry-save adders as well as other types of adders, and to both radix-2 and non-radix-2 implementations of such adders. These and other features and advantages of the present invention will become more apparent from the accompanying drawings and the following detailed description.

DETAILED DESCRIPTION OF THE INVENTION

The present invention will be illustrated below in conjunction with an example prefix tree adder. It should be understood, however, that the invention is not limited to use with any particular type of adder, but is instead more generally applicable to any type of adder in which it is desirable to significantly improve the computational delay associated with generation of an overflow flag without requiring an increase in transistor count or area for the adder circuit, and thus without substantially increasing the cost or complexity of the adder circuit. For example, although illustrated using a radix-2 prefix tree adder, it will be apparent to those skilled in the art that the disclosed techniques are readily applicable to both radix-2 and non-radix-2 adders, as well as to other types of adders, such as carry-lookahead adders, carry-skip adders, carry-ripple adders and carry-save adders.

Figure 2:
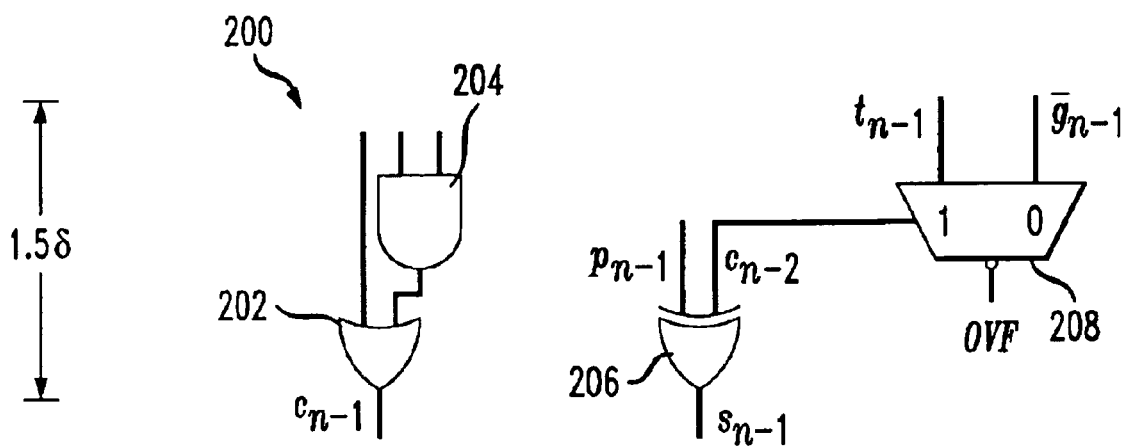
FIG. 2 is a schematic diagram of a logic circuit in accordance with an illustrative embodiment of the invention for computing an overflow flag in an n-bit prefix tree adder or other type of adder.

FIG. 2 shows an example of a logic circuit 200 in accordance with an illustrative embodiment of the present invention. The logic circuit 200 may be used to generate the overflow flag OVF in a conventional n-bit prefix tree adder of the type described above, or in any of a number of other types of adders. The circuit 200 thus represents a portion of such an adder, and in this example includes a two-input OR gate 202, a two-input AND gate 204, a two-input exclusive-or (XOR) gate 206, and a 2-to-1 inverting multiplexer 208.

Figure 1:
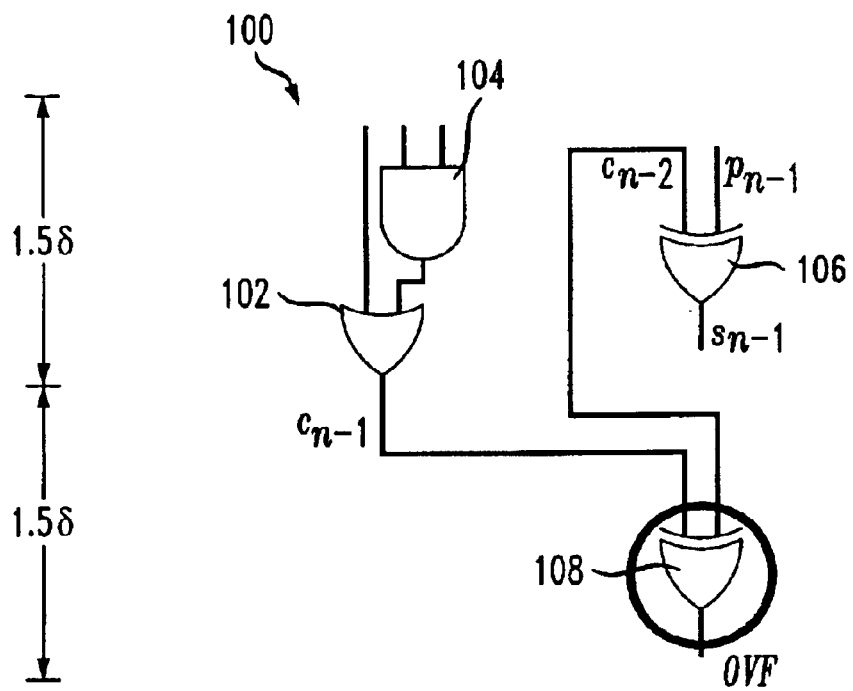
FIG. 1 is a schematic diagram of a conventional logic circuit for computing an overflow flag in an n-bit prefix tree adder.

The primary carry-output signal $c_{n-1}$ is generated as an output of the OR gate 202, as in the conventional logic circuit 100 of FIG. 1. In addition, the carry signal $c_{n-2}$ and the propagate signal $p_{n-1}$ are applied as inputs to the XOR gate 206, which generates the sum signal $s_{n-1}$ as the exclusive-or of the carry signal $c_{n-2}$ and the propagate signals $p_{n-1}$ also as in the conventional logic circuit 100 of FIG. 1. The sum signal $s_{n-1}$ is the final sum bit of the corresponding n-bit adder.

In accordance with the invention, the overflow flag OVF is generated in parallel with generation of the sum signal $s_{n-1}$ and the primary carry-output signal $c_{n-1}$, using 2-to-1 inverting multiplexer 208 as shown in FIG. 2. More specifically, the following formulation is used to define the overflow flag OVF in the illustrative embodiment:

$$OVF = c^{n-1} \oplus c_{n-2} = c_{n-2} \oplus (g_{n-1} + t_{n-1} + t_{n-1} c_{n-2}),$$

which can be simplified as follows:

$$OVF = c_{n-2}\bar{t}_{n-1} + g_{n-1}\bar{c}_{n-2}.$$

Based on this simplification, the overflow flag OVF does not require the use of the primary carry-output signal $c_{n-1}$, and thus can be generated in parallel with the output sum signal $s_{n-1}$ and the primary carry-output signal $c_{n-1}$, as is shown in FIG. 2.

The 2-to-1 inverting multiplexer 208 receives as a first input the transmit signal $t_{n-1}$ and as a second input the generate signal $\bar{g}_{n-1}$. The carry signal $c_{n-2}$ is also applied to the multiplexer 208 as a select signal. Depending on the value of the select signal, the multiplexer 208 selects either the transmit signal $t_{n-1}$ or the generate signal $\bar{g}_{n-1}$ for propagation in inverted form to its output as the overflow flag OVF. More particularly, if the carry signal $c_{n-2}$ has a logic "one" value, the transmit signal $t_{n-1}$ is propagated in inverted form to the output of the multiplexer 208 as the overflow flag OVF, and if the carry signal $c_{n-2}$ has a logic "zero" value, the generate signal $\bar{g}_{n-1}$ is propagated in inverted form to the output of the multiplexer 208 as the overflow flag OVF. The multiplexer 208 thus implements the simplified equation given above for the overflow flag OVF. Although the multiplexer 208 in this embodiment is an inverting multiplexer, the invention can be implemented using other types of circuitry.

Using the previously-described gate level model, the computation delay associated with generation of the overflow flag OVF in the circuit 200 of FIG. 2 is given by the adder delay 1.5δ, as is indicated in the figure. The additional 1.5δ delay associated with the XOR gate 108 in the conventional logic circuit 100 of FIG. 1 is eliminated in this illustrative embodiment of the invention.

Advantageously, the reduction in the computation time required to generate the overflow flag OVF in the illustrative embodiment is achieved without requiring any significant increase in the transistor count or circuit area of the adder, and thus without increasing adder cost or complexity.

It should be emphasized that the logic circuitry in FIG. 2 is shown by way of example only. Those skilled in the art will recognize that numerous alternative arrangements of logic circuitry may be used to reduce the computational delay associated with overflow flag generation in accordance with the techniques of the present invention.

As noted previously, the present invention may be implemented in a number of different types of adders. One such adder will now be described in greater detail in conjunction with FIG. 3.

Figure 3:
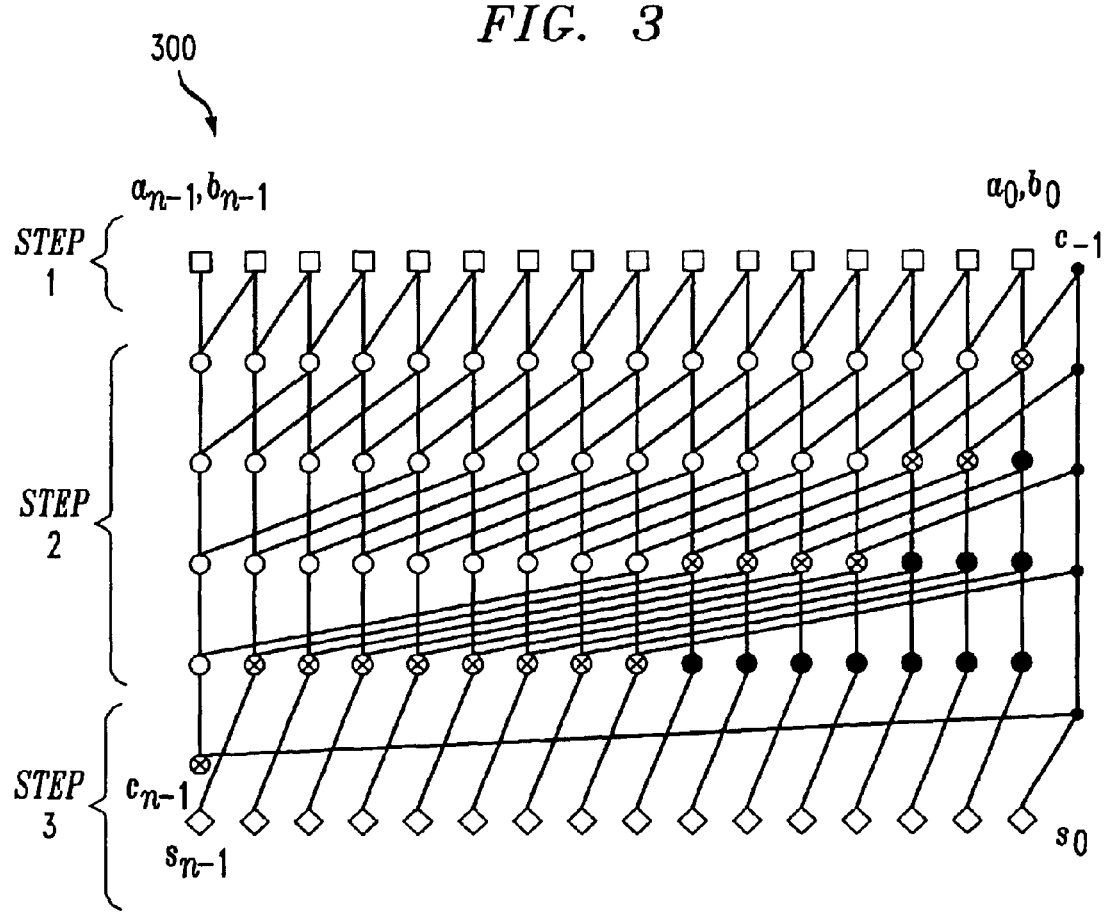
FIG. 3 shows an example of an n-bit prefix tree adder in which the logic circuit of FIG. 2 may be implemented.

FIG. 3 shows a set of superimposed prefix trees 300 for an n-bit prefix tree adder of the type described in the above-cited U.S. patent application Ser. No. 09/291,677, and in which the logic circuit 200 of FIG. 2 may be implemented. The general algorithm for an n-bit radix-2 prefix tree adder of this type is described below.

Step 1 (1 Stage):
Calculate $$\left. \begin{array}{l} g_j = a_j b_j \\ t_j = a_j + b_j \\ p_j = a_j \oplus b_j = \overline{g}_j t_j \end{array} \right\} \forall j \ 0 \leq j < n$$

Step 2 ($\lceil \log_2 n \rceil$ Stages):
For k=1 ... $\lceil \log_2 n \rceil$ calculate $$c_j = G_{j-2^{k-1}+1}{}^j + T_{j-2^{k-1}+1}{}^j c_{j-2^{k-1}} \forall j 2^{k-1} - 1 \leq j < 2^{k-1},$$

$$(G_{j-2^k+1}{}^j, T_{j-2^k+1}{}^j) = (G_{j-2^{k-1}+1}{}^j, T_{j-2^{k-1}+1}{}^j) o (G_{j-2^k+1}{}^{j-2^{k-1}}, T_{j-2^k+1}{}^{j-2^{k-1}}) \forall j 2^{k-1} \leq j < n.$$

Step 3 (1 Stage)
Calculate $$s_j = p_j \oplus c_{j-1} \forall 0 \leq j < n,$$

and $$c_{n-1} = G_0{}^{n-1} + T_0{}^{n-1} c_{-1}.$$

In the set of prefix trees of FIG. 3, the squares at the top of the figure compute $g_j$, $t_j$ and $p_j$ for each bit position in accordance with Step 1. The empty circles apply the fundamental carry operator in accordance with Step 2. The filled circles represent buffers. The crossed circles compute carries in accordance with Step 2 and Step 3 above. The diamonds at the bottom of the figure generate the sum at each bit position from the $p_j$ signal in accordance with the equation of Step 3. It should be noted that the sum computation of in Step 3 occurs in parallel with the computation of the final carry output $c_{n-1}$ in Step 3.

In the above description, $(G_j{}^j, T_j{}^j) = (g_j, t_j)$ and $$(G_i{}^j, T_i{}^j) = (g_j, t_j) o (g_{j-1}, t_{j-1}) o \ldots o (g_1, t_i) \text{ if } j \leq i,$$

where o is the fundamental carry operator. The carry $c_j$ for each bit position is then given by $$c_j = G_0{}^j + T_0{}^j c_{-1}$$

where $c_{-1}$ is the primary carry input. If there is no primary carry input, then $c_j$ is simply $G_0{}^j$.

The logic depth of an n-bit prefix tree adder configured as shown in FIG. 3 is $2 + \lceil \log_2 n \rceil$, and the fanout of the carry input $c_{-1}$ is $1 + \lceil \log_2 n \rceil$. The above-described algorithm can also be extended in a straightforward manner to higher radix prefix trees.

Although static circuits are used in the prefix-tree adder 300 of FIG. 3, it should be noted that the invention may be implemented in an adder circuit which includes either static circuits, dynamic circuits or combinations of both static and dynamic circuits. Static circuits are often preferred to dynamic circuits because of their ease of design.

The above-described illustrative embodiment of the invention maybe configured to meet the requirements of a variety of different circuit applications, and may be implemented in adder circuits using any desired value of n. Moreover, as previously noted, a variety of other types of adders, including non-radix-2 adders, may also be implemented using the techniques of the present invention.

Adders in accordance with the invention may be used as elements of many different types of circuits, such as, e.g., arithmetic logic units (ALUs), multiply-add units, and comparators. The invention can be incorporated in a wide variety of integrated circuits or other processing devices, including, e.g., microprocessors, digital signal processors (DSPs), microcontrollers, application-specific integrated circuits (ASICs), memory circuits, telecommunications hardware and other types of processing devices.

As a more particular example, the overflow flag generation techniques of the invention can be implemented in a straightforward manner in a DSP such as the DSP16000 from the Microelectronics Group of Lucent Technologies Inc., Allentown, Pa., as described in DSP16000 Digital Signal Processor Core, Information Manual, Lucent Technologies, July 1998, which is incorporated by reference herein. In the DSP 16000, two modules which can be configured to utilize the overflow flag generation techniques of the invention are the ADDSUB and ALU modules, both described in the above-cited Information Manual.

Numerous alternative embodiments of the present invention within the scope of the following claims will be readily apparent to those skilled in the art.

What is claimed is:

1. An adder comprising: a plurality of computational stages each associated with one or more bit positions of the adder, the plurality of computational stages including one or more computational stages for generating a sum output signal and a primary carry-output signal of the adder; and a flag generation circuit coupled to at least one signal line of at least one of the computational stages and operative to generate an overflow flag for the adder, the overflow flag being separate and distinct from the primary carry-output signal, the overflow flag being generated utilizing a transmit signal and a generate signal of the adder; wherein the adder comprises an n-bit adder and the primary carry-output signal comprises a primary carry-output signal $c_{n-1}$ of the n-bit adder, and wherein the transmit signal and generate signal are (n−1)th transmit signal and (n−1)th generate signal respectively of the n-bit adder.

2. The adder of claim 1 wherein the adder comprises an n-bit adder and the sum output signal comprises a final sum bit $s_{n-1}$ of the n-bit adder.

3. The adder of claim 1 wherein the flag generation circuit does not require the primary carry-output signal to generate the overflow flag for the adder.

4. The adder of claim 1 wherein the adder comprises a prefix tree adder having a plurality of prefix trees, each associated with one of the bit positions of the adder and including one or more of the computation stages.

5. The adder of claim 1 wherein the adder comprises a carry-lookahead adder.

6. The adder of claim 1 wherein the adder comprises a carry-skip adder.

7. The adder of claim 1 wherein the adder comprises a carry-ripple adder.

8. The adder of claim 1 wherein the adder comprises a carry-save adder.

9. The adder of claim 1 wherein the adder comprises a radix-2 adder.

10. The adder of claim 1 wherein the adder comprises a non-radix-2 adder.

11. An adder comprising:
 a plurality of computational stages each associated with one or more bit positions of the adder, the plurality of computational stages including one or more computational stages for generating a sum output signal and a primary carry-output signal of the adder; and
 a flag generation circuit coupled to at least one signal line of at least one of the computational stages and operative to generate an overflow flag for the adder, the overflow flag being generated substantially in parallel with the generation of at least one of the sum output signal and the primary carry-output signal of the adder;

wherein the adder comprises an n-bit adder and the flag generation circuit generates an overflow flag OVF as:

$$OVF = c_{n-2} \bar{t}_{n-1} + g_{n-1} \bar{c}_{n-2},$$

where $c_{n-2}$ is an n−2 carry signal of the adder, $t_{n-1}$ is an n−i transmit signal of the adder, and $g_{n-1}$ is an n−1 generate signal of the adder, such that the generation of the overflow flag OVF does not require the use of a primary carry-output signal $c_{n-1}$ of the adder.

12. An adder comprising: a plurality of computational stages each associated with one or more bit positions of the adder, the plurality of computational stages including one or more computational stages for generating a sum output signal and a primary carry-output signal of the adder, and a flag generation circuit coupled to a plurality of signal lines of at least one of the computational stages and operative to generate an overflow flag for the adder, the overflow flag being generated substantially in parallel with the generation of at least one of the sum output signal and the primary carry-output signal of the adder; wherein the flag generation circuit comprises a multiplexer having at least a first input corresponding to a transmit signal coupled to a first one of the plurality of signal lines, a second input corresponding to a generate signal coupled to a second one of the plurality of signal lines, a select signal input coupled to a third one of the plurality of signal lines, and an output, the multiplexer being configured to select one of a plurality of input signals applied to its first and second inputs for propagation to its output as the overflow flag based at least in part on a signal applied to the select signal input.

13. An adder comprising: a plurality of computational stages each associated with one or more bit positions of the adder, the plurality of computational stages including one or more computational stages for generating a sum output signal and a primary carry-output signal of the adder; and a flag generation circuit coupled to a plurality of signal lines of at least one of the computational stages and operative to generate an overflow flag for the adder, the overflow flag being generated substantially in parallel with the generation of at least one of the sum output signal and the primary carry-output signal of the adder; wherein the flag generation circuit comprises a 2-to-1 multiplexer having a first input corresponding to a transmit signal coupled to a first one of the plurality of signal lines and having a first signal applied thereto, a second input corresponding to a generate signal coupled to a second one of the plurality of signal lines and having a second signal applied thereto, an output corresponding to the overflow flag, and a select signal input coupled to a third one of the plurality of signal lines for selecting one of the first signal and the second signal for propagation to the output as the overflow flag.

14. An adder comprising:

a plurality of computational stages each associated with one or more bit positions of the adder, the plurality of computational stages including one or more computational stages for generating a sum output signal and a primary carry-output signal of the adder; and a flag generation circuit coupled to at least one signal line of at least one of the computational stages and operative to generate an overflow flag for the adder, the overflow flag being generated substantially in parallel with the generation of at least one of the sum output signal and the primary carry-output signal of the adder;

wherein the flag generation circuit comprises a 2-to-1 multiplexer having a first input having a first signal applied thereto, a second input having a second signal a lied thereto, an output corresponding to the overflow flag, and a select signal input for selecting one of the first signal and the second signal for propagation to the output as the overflow flag;

wherein the adder comprises an n-bit adder and the multiplexer receives as the first input a transmit signal $t_{n-1}$ receives as the second input a generate signal $\bar{g}_{n-1}$, receives as the select signal a carry signal $c_{n-2}$, and depending on the value of the select signal, the multiplexer selects either the transmit signal $t_{n-1}$ or the generate signal $\bar{g}_{n-1}$ for propagation in inverted form to its output as the overflow flag.

15. An integrated circuit comprising: at least one adder, the adder comprising: (i) a plurality of computational stages each associated with one or more bit positions of the adder, the plurality of computational stages including one or more computational stages for generating a sum output signal and a primary carry-output signal of the adder; and (ii) a flag generation circuit coupled to at least one signal line of at least one of the computational stages and operative to generate an overflow flag for the adder, the overflow flag being separate and distinct from the primary carry-output signal, the overflow flag being generated utilizing a transmit signal and a generate signal of the adder; wherein the adder comprises an n-bit adder and the primary carry-output signal comprises a primary carry-output signal $c_{n-1}$ of the n-bit adder, and wherein the transmit signal and generate signal are (n−1)th transmit signal and (n−1)th generate signal respectively of the n-bit adder.

16. A method for performing a computational operation in an adder, the method comprising the steps of: providing a plurality of computational stages each associated with one or more bit positions of the adder, the plurality of computational stages including one or more computational stages for generating a sum output signal and a primary carry-output signal of the adder, and generating an overflow flag for the adder using at least one signal associated with at least one of the computational stages, the overflow flag being separate and distinct from the primary carry-output signal, the overflow flag being generated utilizing a transmit signal and a generate signal of the adder; wherein the adder comprises an n-bit adder and the primary carry-output signal comprises a primary carry-output signal $c_{n-1}$ of the n-bit adder, and wherein the transmit signal and generate signal are (n−1)th transmit signal and (n−1)th generate signal respectively of the n-bit adder.

* * * * *

UNITED STATES PATENT AND TRADEMARK OFFICE
CERTIFICATE OF CORRECTION

PATENT NO. : 6,912,560 B2
DATED : June 28, 2005
INVENTOR(S) : A. Goldovsky

It is certified that error appears in the above-identified patent and that said Letters Patent is hereby corrected as shown below:

Column 7,
Line 10, delete "n-i" and insert -- n-1 --.

Signed and Sealed this

Twenty-third Day of August, 2005

JON W. DUDAS
*Director of the United States Patent and Trademark Office*